(12) United States Patent
Dimou

(10) Patent No.: US 8,665,826 B2
(45) Date of Patent: Mar. 4, 2014

(54) ADAPTATION OF HANDOVER COMMAND SIZE IN A MOBILE TELECOMMUNICATION NETWORK

(75) Inventor: Konstantinos Dimou, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 641 days.

(21) Appl. No.: 13/000,152

(22) PCT Filed: Jul. 4, 2008

(86) PCT No.: PCT/EP2008/058675
§ 371 (c)(1),
(2), (4) Date: Dec. 20, 2010

(87) PCT Pub. No.: WO2010/000328
PCT Pub. Date: Jan. 7, 2010

(65) Prior Publication Data
US 2011/0103347 A1    May 5, 2011

(51) Int. Cl.
*H04J 3/26* (2006.01)
*H04W 36/00* (2009.01)

(52) U.S. Cl.
USPC .......................................... 370/331; 455/436

(58) Field of Classification Search
None
See application file for complete search history.

(56) References Cited

U.S. PATENT DOCUMENTS

| | | | |
|---|---|---|---|
| 5,491,837 A * | 2/1996 | Haartsen | 455/437 |
| 8,369,857 B2 * | 2/2013 | Dimou et al. | 455/441 |
| 2002/0037726 A1 | 3/2002 | Czaja et al. | |
| 2004/0037249 A1 * | 2/2004 | Chae et al. | 370/332 |
| 2005/0195822 A1 | 9/2005 | Lim et al. | |
| 2006/0109820 A1 * | 5/2006 | Miyata | 370/332 |
| 2007/0064651 A1 * | 3/2007 | Kim et al. | 370/331 |
| 2007/0077928 A1 * | 4/2007 | Kim et al. | 455/436 |
| 2009/0172791 A1 | 7/2009 | Du et al. | |
| 2010/0130206 A1 * | 5/2010 | Chin et al. | 455/436 |

FOREIGN PATENT DOCUMENTS

| | | |
|---|---|---|
| CN | 1738476 A | 2/2006 |
| CN | 101047966 A | 10/2007 |
| CN | 101115296 A | 1/2008 |

OTHER PUBLICATIONS

International Preliminary Report on Patentability and Written Opinion of the International Searching Authority, PCT Application No. PCT/EP2008/058675, Jan. 5, 2011 (7 pages).
International Search Report, PCT Application No. PCT/EP2008/058675, Aug. 4, 2009.
Nokia Siemens Networks et al., "Handover Command Contents" 3GPP Draft; R2-073922, 3rd Generation Partnership Project; vol. tsg_ran\WG2_RL2\TSGR2_59bis\Docs, No. Shanghai, China; Oct. 8, 2007, XP050136574, Oct. 1, 2007.
Ericsson: "Enhancements of handover-related signaling in AMR networks" 3GPP Draft; GP-041044, 3rd Generation Partnership Project (3GPP), vol. tsg_geran\TSG_GERAN\GERAN_19_Cancun\Docs, No. Cancun; Apr. 19, 2004, XP050011040, Apr. 14, 2004.

(Continued)

*Primary Examiner* — Steven H Nguyen
(74) *Attorney, Agent, or Firm* — Myers Bigel Sibley & Sajovec, P.A.

(57) ABSTRACT

The present invention relates to a method and a base station for determining a handover command based on mobility related parameters such as a handover margin or a time value required to trigger the handover.

24 Claims, 8 Drawing Sheets

(56) References Cited

OTHER PUBLICATIONS

Ericsson: "Segmentation of Handover command and Assignment command" 3GPP Draft; GP-070265, $3^{rd}$ Generation Partnership Project (3GPP), vol. tsg_geran\TSG_GERAN\GERAN_33_Seoul\Docs, No. Seoul; Feb. 12, 2007, Feb. 7, 2007.

Ericsson: "Assembly of Intra-E-UTRAN handover command" 3GPP Draft; R3-070448, $3^{rd}$ Generation Partnership Project (3GPP), vol. tsg_ran\WG3_Iu\TSGR3_55\docs, No. St. Louis, Missouri; Feb. 12, 2007, XP050161335, Feb. 16, 2007.

Orange: "Self-optimization use case: self-tuning of handover parameters" 3GPP Draft; R3-071262, $3^{rd}$ Generation Partnership Project (3GPP), vol. Joint_Meetings\R3S5_LTE_0607_Sophia_Antipolis\docs, No. Sophia; Jun. 13, 2007, XP050020550, Jun. 8, 2007.

Chinese First Office Action Corresponding to Chinese Patent Application No. 200880130307.6; Date of Issue: Jan. 14, 2013; 8 Pages.

3GPP, Technical Specification, "3rd Generation Partnership Project; Technical Specification Group Radio Access Network; Radio Resource Control (RRC); Protocol Specification (Release 8)", 3GPP TS 25.331 V8.0.0 (Sep. 2009), 1458 pp.

3GPP, Technical Specification, "3rd Generation Partnership Project; Technical Specification Group Radio Access Network; Evolved Universal Terrestrial Radio Access (E-UTRA) Radio Resource Control (RRC); Protocol specification (Release 8)", 3GPP TS 36.331 V8.0.0 (Dec. 2007), 56 pp.

3GPP, Technical Specification, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300 V8.2.0 (Sep. 2007), 109 pp.

* cited by examiner

ADAPTATION OF HANDOVER COMMAND SIZE IN A MOBILE TELECOMMUNICATION NETWORK

CROSS REFERENCE TO RELATED APPLICATION

This application is a 35 U.S.C. §371 national stage application of PCT International Application No. PCT/EP2008/058675, filed on 4 July 2008, the disclosure and content of which is incorporated by reference herein in its entirety. The above-referenced PCT International Application was published in the English language as International Publication No. WO 2010/000328 A1 on 7 Jan. 2010.

TECHNICAL FIELD

The present invention relates to a method and a base station of a mobile telecommunication network, and in particular to a method and a base station for determining a handover command.

BACKGROUND

The Universal Mobile Telecommunication System (UMTS) Terrestrial Radio Access Network (UTRAN) is a radio network, which is also known as a third-generation (3G) mobile communication technology. Evolved UMTS Terrestrial Radio Access Network (E-UTRAN), also referred to as Long Term Evolution (LTE) is a project within the 3rd Generation Partnership Project (3GPP) to provide high speed packet access functionality to cope with future requirements in terms of higher data rates and improved efficiency.

An E-UTRAN of LTE typically comprises mobile terminals (MT) 150 wirelessly connected to one or several base stations 130A-C as illustrated in FIG. 1. The base stations 130A-C are shown connected to a core network (CN) 100 e.g. via a mobility management entity (MME) (not shown). In addition, the base stations 130A-C may also be connected to each other via an interface. The base stations are usually referred to as eNodeB in E-UTRAN. It should be noted that in a UTRAN a base station is referred to as a NodeB.

In LTE, a robust and fast handover is a challenging task. One reason is that in LTE, handover between two base stations implies complete cut-off of a mobile terminals connection to its serving base station, before the mobile terminal attempts to access a target base station; i.e., hard handover is used in LTE.

Another reason making a design of an efficient handover mechanism a challenging task in 3GPP LTE, is a distributed architecture of this system, which requires co-ordination between neighbouring base stations since as previously described the base stations are connected to each other. Furthermore the handover mechanism is not compliant with earlier releases of 3GPP (UMTS) where soft-handover is implemented.

Referring to FIG. 2, reference number 21 represents a serving base station which is currently serving a mobile terminal 20 and reference number 22 represents a target base station to which the mobile terminal is to be handed over. FIG. 2 illustrates a signalling flow chart during handover, as described within 3GPP LTE [2], see Appendix. In FIG. 2, signalling exchanged over an air interface between a mobile terminal (MT) 20 and the base stations 21 and 22 are shown. FIG. 2 also shows signalling exchanged via cables connecting the serving base station 21 and the target base station 22 and the target base station 22 and the MME 29.

The handover procedure starts upon triggering of an event 28 in the mobile terminal 20. For example the event 28 is triggered when the received signal strength from the target base station 22 is within a range of X dBs, e.g. 5 dB, from a signal received by the serving base station 21.

Hence, upon the event trigger 28, the mobile terminal 20 transmits a measurement report 23 to the serving base station 21. This report is a Radio Resource Control (RRC) signalling message. It is the serving base station 21 that decides to handover the mobile terminal 20 to the target base station 22. When the serving base station 21 makes a handover decision 24 it transmits a HANDOVER REQUEST message 25 to the target base station 22. This message 25 is transmitted via cable using the X2 communication protocol [2], see Appendix.

Referring back to FIG. 2, when the target base station 22 receives the HANDOVER REQUEST 25 it checks the availability of resources in the target cell served by the target base station 22. In case there are available resources, the target base station 22 transmits a response to the serving base station 21. The response is a message, HANDOVER REQUEST ACK 26. Upon reception of the HANDOVER REQUEST ACK 26, the serving base station 21 transmits a handover command 27 to the mobile terminal 20 over the air interface. The handover command 27 is also an RRC message. The serving base station 21 can start forwarding packets of the mobile terminal 20 being stored on a down link (DL) transmission buffer. Upon reception of the handover command 27, the mobile terminal 20 starts a random access procedure to the target base station 22. During the random access procedure, the mobile terminal 20 tries to synchronize with the target base station 22. Upon successful random access to the target base station 22, the mobile terminal 20 gets an allocation grant from the target base station 22. Upon reception of this grant, the mobile terminal 20 transmits a HANDOVER CONFIRM message 30 to the target base station 22 now acting as a new serving base station 22. After reception of the HANDOVER CONFIRM message 30, the new serving base station 22 transmits a HANDOVER COMPLETE message 31 to the mobility management entity 29 (MME). The HANDOVER COMPLETE message 31 is transmitted via a S1 interface built on a cable connecting the new serving base station 22 with the MME 29. A reception of this message 31 at the MME 29 triggers a switching of the path for data packets for the mobile terminal 20 being handed over. Following to the switching of paths, the MME 29 notifies the new serving base station 22 of this path switching. This notification is done with aid of a message HANDOVER COMPLETE ACK 32. The new serving base station 22 notifies the previous serving base station 21 by transmitting a message, RELEASE RESOURCES 33. This message 33 is transmitted via X2 and it signals an end of the handover procedure.

As previously described the handover command is transmitted over the air interface. The handover command comprises among others the identity of the target base station and it is the first message transmitted from the network to the mobile terminal during the handover procedure. As well known signalling messages exchanged over the air interface are most susceptible to losses. This handover command message is therefore important for the success of the handover procedure. In order to increase robustness of the whole handover procedure, the handover command is usually transmitted with very low error rate. The handover command also includes a list of parameters to be used in the target cell, e.g. parameters for radio bearer establishment in the target cell as described in [1], [2] and [3], see Appendix. In LTE, it is suggested to use additional information in the handover command, such as an identity of dedicated preambles the mobile terminal can apply in the target cell as described in [3], §5.3.4.2, see Appendix. Thus the list of parameters can be quite long. Hence, the transmission of this handover command message can require a high bit rate for the transmission of the handover command to the mobile terminal. In case the mobile terminal when receiving the handover command is located far from its serving base station or in not so favourable radio conditions it might not be able to bear the data rate which is required for transmission of the handover command.

There is therefore a need for a solution for increasing the robustness for transmission of the handover Command.

SUMMARY

An object of the present invention is thus to increase the robustness for transmission of the handover command.

This object is according to the present invention achieved by adapting the size of the handover command based on mobility related parameters such as a handover margin and/or a time value corresponding to time required to trigger the handover decision.

According to a first aspect of the present invention, a method for a base station for determining a handover command is provided. The method comprises determining a minimum amount of information necessary for the handover command. The information comprises a temporary media access control identification, MAC ID for a mobile terminal. A number of bits required for the information is also determined. The method further comprises determining an additional number of bits for the handover command as inversely proportional to a handover margin and/or a time value, where the handover margin represents a difference in signal strength required to trigger the handover of the mobile terminal between the base station and another base station. In the method the time value represents a time required to trigger the handover of the mobile terminal between the base station and the another base station, during which a difference between a signal strength measured by the mobile terminal on a signal from the base station and another signal strength measured by the mobile terminal on a signal from the another base station, is equal to or greater than the handover margin.

According to a second aspect a base station suitable for use in a mobile telecommunication system is provided. The base station comprises means for determining a minimum amount of information necessary for a handover command. The information comprises a temporary media access control identification, MAC ID, for a mobile terminal. The means for determining also determines the number of bits required for the information and an additional number of bits of the handover command. The additional number of bits is determined as inversely proportional to a handover margin and a time value, where the handover margin represents a difference in signal strength required to trigger a handover of the mobile terminal between the base station and another base station. The time value represents a time required to trigger a handover of the mobile terminal between the base station and the another base station, during which a difference between a signal strength measured by the mobile terminal on a signal from the base station and another signal strength measured by the mobile terminal on a signal from the another base station, is equal to or greater than the handover margin.

An advantage with embodiments of the present invention is that a loss rate of the handover command is reduced. Yet another advantage of embodiments of the present invention is that the handover loss rate also is reduced.

Further advantages with embodiments of the present invention are higher radio resources usage because of the adaption of the handover command size. Yet a further advantage with embodiments of the present invention is lower interference in the mobile telecommunication system because of adaption of the handover command size.

BRIEF DESCRIPTION OF THE DRAWINGS

The invention will in the following be described in more detail with reference to enclosed drawings, wherein.

DETAILED DESCRIPTION

In the following description, for purposes of explanation and not limitation, specific details are set forth, such as particular sequences of steps, signalling protocols and device configurations in order to provide a thorough understanding of the present invention. It will be apparent to one skilled in the art that the present invention may be carried out in other embodiments that depart from these specific details.

Moreover, those skilled in the art will appreciate that functions and means explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

Figure 1:
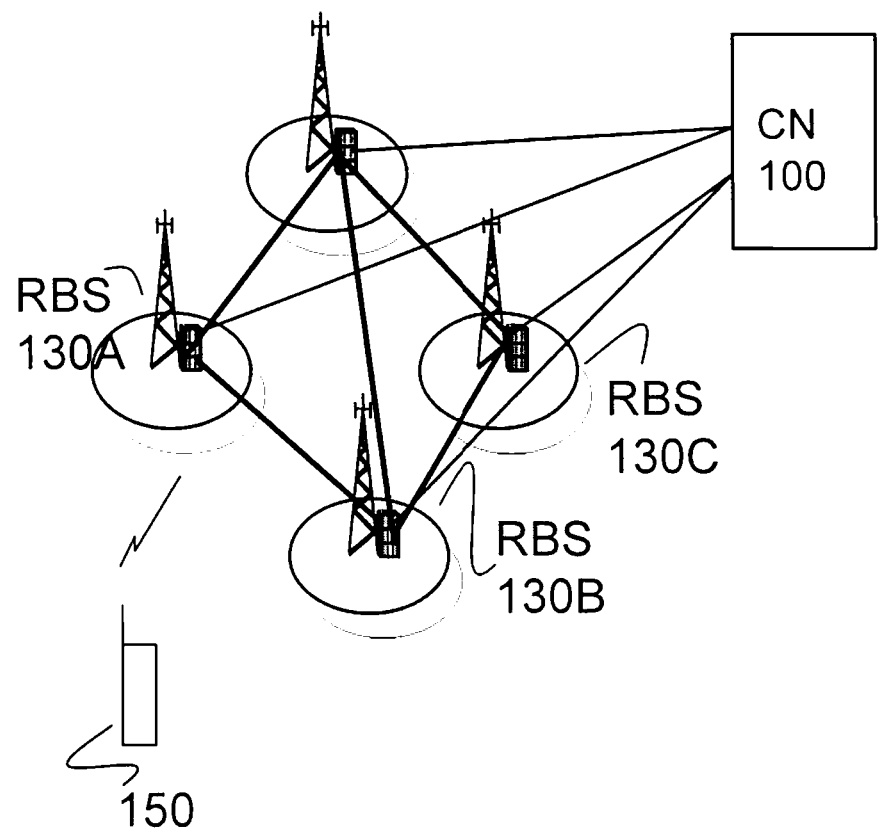
FIG. 1 illustrates schematically a wireless communication network wherein exemplary embodiments of the present invention may be implemented.
Figure 2:
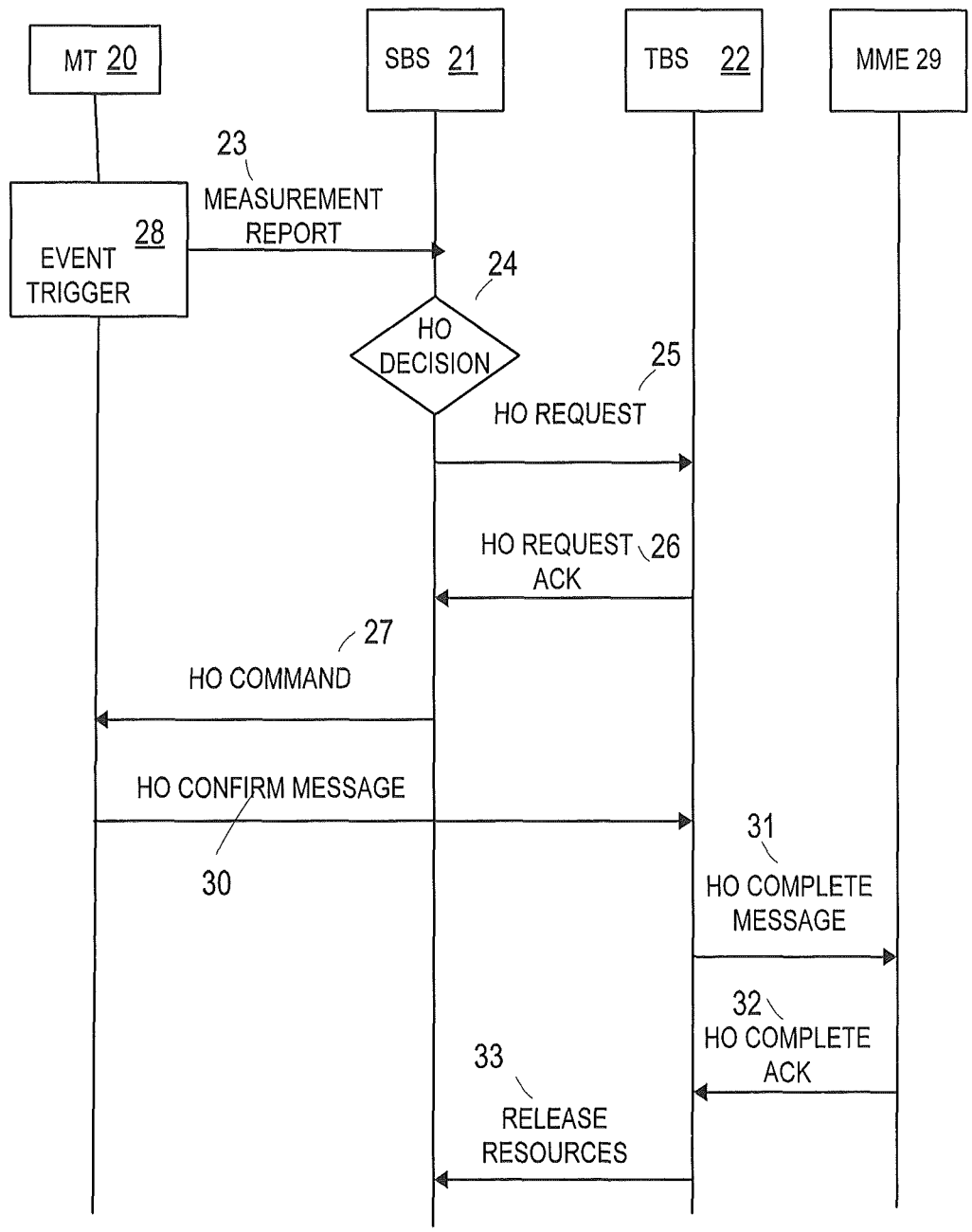
FIG. 2 illustrates a signaling diagram for a handover procedure according to prior art.
Figure 3:
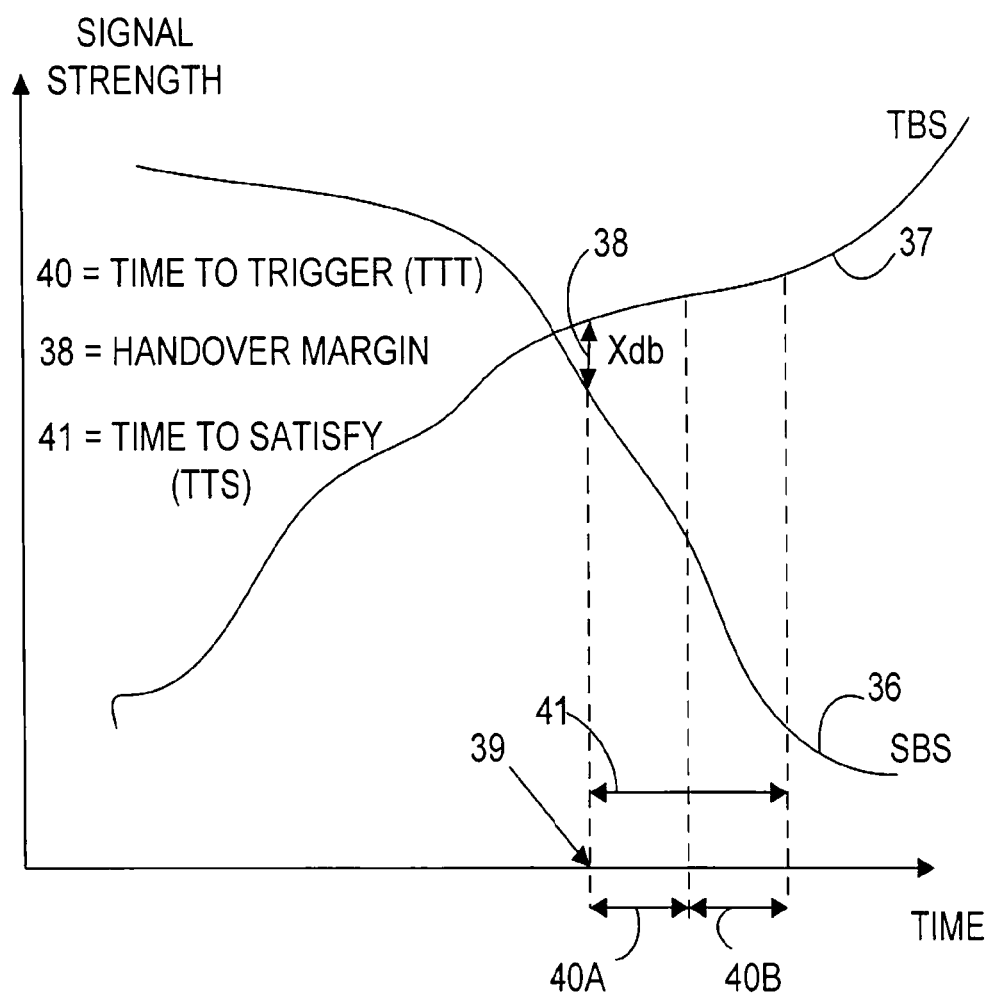
FIG. 3 illustrates an example of signal strengths from base stations measured by a mobile terminal.

Referring to FIG. 3 there are illustrated examples of signal strengths measurements 36; 37 perceived by a mobile terminal (not shown) from a serving base station (SBS) and a target base station (TBS). As described earlier the handover procedure starts upon triggering of an event in the mobile terminal. An example of an event is when a handover margin is satisfied, which means that the received signal strength 37 from the TBS is within a range of X dBs from the signal strength received 36 from the SBS.

As can be seen in the example of FIG. 3, the handover margin denoted 38, is here considered satisfied at a point of time denoted 39.

In case a difference in signal strength perceived by the mobile terminal from the serving base station and the target base station is equal or greater than the handover margin, a time interval, denoted here, time to trigger 40A, then the mobile terminal transmits a measurement report to its serving base station. When the serving base station receives the measurement report it can decide to handover the mobile terminal to the target base station. In case the difference in signal strength is equal to or greater than the handover margin for yet another time to trigger (TTT) 40B the mobile terminal transmits yet another measurement report to its serving base station. It should be noted that the serving base station can wait until several measurement reports have been received before the handover decision is triggered. FIG. 3 also shows another time interval 41 which corresponds to a time interval required for the serving base station to trigger the handover decision, when several measurement reports are required. This time interval 41 is defined here as time to satisfy (TTS).

It should be noted that the handover margin, time to trigger and time to satisfy are design parameters in the network.

According to the present invention the handover command size can be adapted based on mobility related parameters such as the handover margin and/or the time to trigger or the time to satisfy or a combination thereof.

These mobility related parameters determine implicitly the radio propagation conditions for the mobile terminal, for instance at a moment the HO Command is transmitted. E.g. in a scenario when the handover margin is 5 dB, which means that the signal strength perceived by the mobile terminal from the TBS is at least 5 dB higher than the signal strength perceived by the mobile terminal from the SBS. Thus as a consequence, the radio resources are better utilized and the interference is reduced in the network since the size of the handover command is adapted based on the radio conditions.

Furthermore the handover margin and the time to trigger or the time to satisfy implicitly define, in a radio network consisted of macro-cells, a distance from the serving base station at which a handover algorithm triggers the handover decision of the mobile terminal to the target base station. If for example the handover command is transmitted few milliseconds after the handover decision, due to an inter base station communication between the SBS and TBS, then the handover margin and the time to satisfy or the time to trigger defines how far from the serving base station the mobile terminal receives the handover command.

Consider a scenario where a mobile terminal is moving in a pattern in a network, where the network is loaded to a certain level. The handover margin is 5 dB and the signal strength perceived by the mobile terminal from the SBS is −110 dBm, at a moment when the handover margin is satisfied. This means that the signal strength from the TBS is at least −105 dBm at the same moment. The handover margin is satisfied when the mobile terminal is at a given location A, which is a distance d far from the SBS.

Consider another scenario where the same mobile terminal is moving with exactly the same pattern in the same network, with the same load, with a difference that the handover margin now is 0 dB. The TTS is the same in both scenarios. This implies that in this another scenario, the handover margin is satisfied when signal strength from the TBS is higher or equal than the signal strength from the SBS. This means that the handover margin is satisfied when the MT is situated in a location B. This location B is a distance d' from the SBS and, d' is smaller than d. Hence, the signal strength to the SBS is going to be higher than −110 dBm, when the handover margin is satisfied.

The handover command usually contains a number of bits used to convey e.g. parameters. However according to the present invention when the time to satisfy or time to trigger and/or the handover margin are set to low values the number of bits of the handover command is increased by including additional parameters such as radio bearer establishment parameters.

Thus, according to the present invention, there are disclosed a method and a base station for determining the number of bits of the handover command based on at least the handover margin and/or a time to satisfy or time to trigger.

Figure 4:
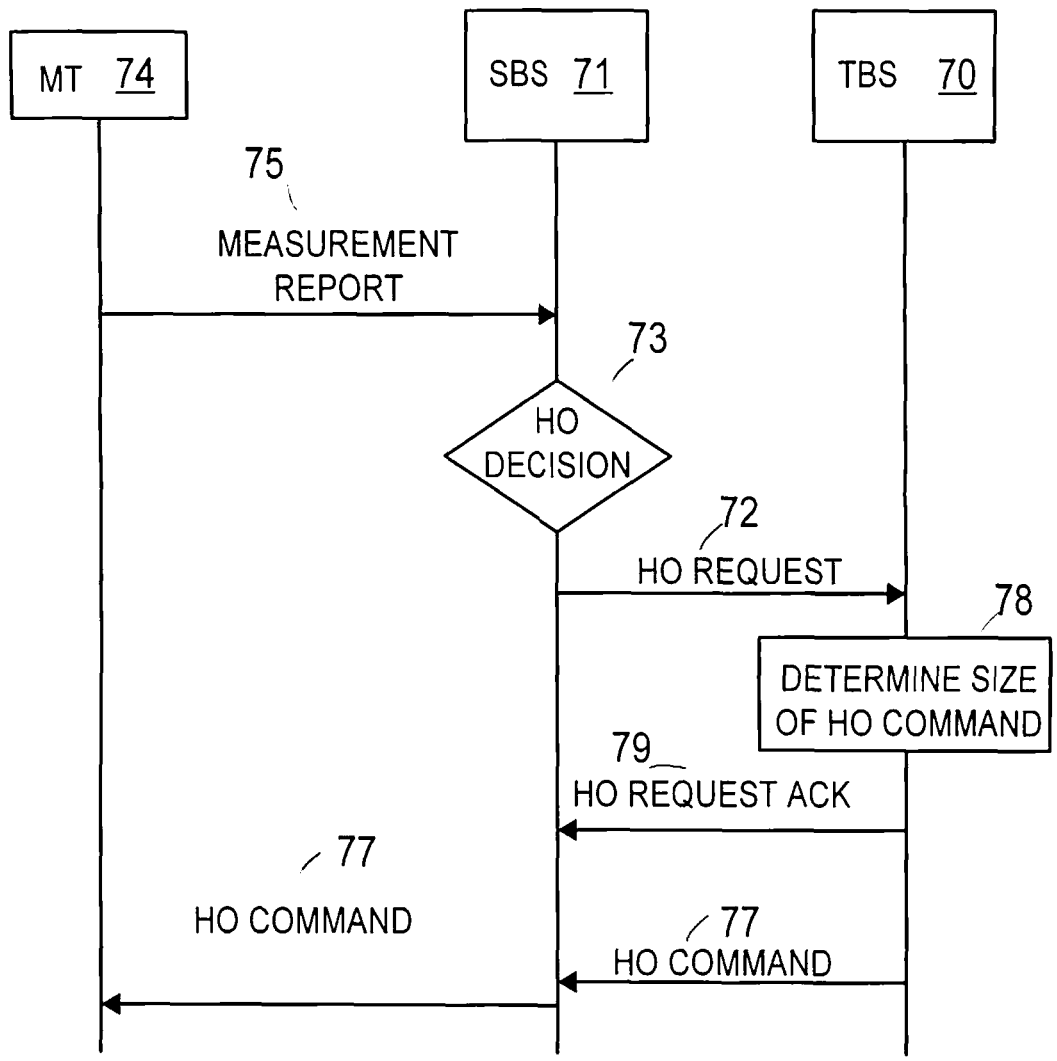
FIG. 4 illustrates a signaling diagram for a handover procedure according to exemplary embodiments of the present invention.

Turning now to FIG. 4, which shows a signaling diagram according to exemplary embodiments of the present invention where the size of the handover command is adapted in the target base station (TBS) 70.

As shown, after a handover decision (HO DECISION) 73 is made by the serving base station (SBS) 71, the target base station 70, receives a message 72 from the serving base station 71, the message 72 comprises a handover margin and/or a time to satisfy or a time to trigger. The message is a handover request message (HO REQUEST) 72.

According to an exemplary embodiment the handover decision is triggered by the serving base station 71 after reception of only one measurement report 75 from mobile terminal (MT) 74. In such case the time to trigger is sent to the target base station 70, in the HO REQUEST 72. If the trigger of the handover decision is due after reception of several measurement reports, then the TTS is sent in the HO REQUEST 72.

In addition to the handover margin and/or the time to satisfy or the time to trigger, the message 72 may further comprise at least one signal strength value from the serving base station 71, measured by the mobile terminal 74. The message may also comprise information about a source cell type e.g. whether the source cell served by the serving base station 71 is a macro, a micro, a pico or a femto cell. As shown in FIG. 4 the mobile terminal is configured to send one or several measurement reports, including signal strength values from the serving base station perceived by the MT 74. One or several of these measurement reports may also be included in the HO REQUEST 72.

Furthermore the message 72 may in addition to the handover margin and/or the time to satisfy or the time to trigger also comprises information indicating whether the mobile terminal 74 is close to losing coverage from the serving base station 71.

Referring back to FIG. 4, the target base station 70 determines, in a step 78, a minimum amount of information of the handover command (HO Command) 77, necessary for the mobile terminal to be able to communicate with the target base station 70. The minimum amount of information includes a temporary media access control identification, MAC ID for the mobile terminal 74. The minimum amount of information may further include the target cell identity (ID) and a carrier frequency. The target cell ID is defined in the standard as targetCellIdentity. The minimum amount of information may also include an uplink and a downlink bandwidth. However, note that the uplink and downlink bandwidth of the target cell are only included in case these are different from the uplink and downlink bandwidth of the serving cell. The minimum amount of information may also include a Random Access Channel (RACH) preamble to be used in the target cell. However note that the preamble is only included in case of dedicated random access to the target cell.

In step 78 the target base station 70 also determines a number of bits required for the minimum amount of information. According to an exemplary embodiment of the invention the target base station further determines an additional number of bits for the handover command 77 as inversely proportional to the handover margin and the time to trigger or time to satisfy.

The determination of the additional number of bits in step 78 is performed according to formula (1) below:

$$HO\_COMMAND_{size} = m + \frac{1}{(HO_{margin})^k} \cdot b_1 + \frac{1}{(N*TTT/MeasurementPeriod)^l} \cdot b_2 \quad (1)$$

where:
HO_COMMANDsize: handover command size in number of bits.
m: minimum size of handover command in number of bits, based on the minimum amount of information that needs to be transmitted in the handover command
$HO_{margin}$: handover margin in linear scale
TTT: time to trigger, in seconds
Measurement Period: is a time interval in seconds between two measurement instants at the mobile terminal
k: an integer, minimum value: 1
l: an integer, minimum value: 1
b1: number of bits
b2: number of bits
TTT=is a multiple (M) of a measurement period where the multiple is an integer with minimum value 1
M: M is an integer with minimum value M=1

In case of several measurement reports before the triggering of the handover decision, time to trigger (ITT) is replaced in formula (1) by time to satisfy (TTS). TTS=N×TTT, where N is an integer with minimum value N=1.

According to another embodiment of the target base station 70 determines the additional number of bits of the handover command according to formula (2) below. In the exemplary embodiment the signal strength from the serving base station, perceived by the mobile terminal is taken into account. The values of the signal strength may be include in the HO REQUEST 72 or in the measurement report of the HO REQUEST 72. The signal strength may for instance be a Received Signal Received Power (RSRP) value, a Received Signal Strength Quality (RSRQ) value or a Received Signal Strength Indicator (RSSI) value.

$$HO\_COMMAND_{size} = m + \frac{1}{(HO_{margin})^k} \cdot b_1 + \frac{1}{(N*TTT/MeasurementPeriod)^l} \cdot b_2 + c; \quad (2)$$

where $$c = \begin{cases} c_1, & \text{if signal strength from serving cell} < \text{threshold 1} \\ c_2, & \text{if threshold 1} < \text{signal strength serving cell} < \text{threshold 2} \\ c_3, & \text{if signal strength from serving cell} > \text{threshold 2}; \end{cases} \quad (3)$$

in case only the last signal strength value is transmitted.
where
c1<c2<c3
and threshold 1<threshold 2
c, c1, c2, c3: number of bits
threshold 1, threshold 2: in dBm According to a further embodiment of the invention the target base station 70 determines the additional number of bits of the handover command according to formula (4) below. In the embodiment the TBS 70 calculates a mean value and a variance of the signal strengths included in received measurement reports, included in the HO REQUEST 72, or signal strengths included in the HO REQUEST 72. The signal strength may for instance be a Received Signal Received Power (RSRP) value, a Received Signal Strength Quality (RSRQ) value or a Received Signal Strength Indicator (RSSI) value.

$$HO\_COMMAND_{size} = m + \frac{1}{(HO_{margin})^k} \cdot b_1 + \frac{1}{(N*TTT/MeasurementPeriod)^l} \cdot b_2 + c + d \quad (4)$$

where c can be obtained by:

$$c = \begin{cases} c_1, & \text{if mean value of signal strengths} < \text{threshold} \\ c_2, & \text{if threshold 1} < \text{if mean value of signal strengths} < \text{threshold 2} \\ c_3, & \text{if mean value of signal strengths} > \text{threshold 2} \end{cases}$$

and d can be given by:

$$d = \begin{cases} d_1, & \text{if variance of signal strength} < \text{threshold 3} \\ d_2, & \text{if variance of signal strength} > \text{threshold 3} \end{cases} \quad (5)$$

where d1>d2
d, d1, d2: number of bits
threshold 3 : in dB

The target base station may further use information on the source cell served by the serving base station, in case such information is available in the HO REQUEST 72. Information on source cell may indicate that the cell is a is a macro, a micro, a pico or a femto cell. It should be noted that information on whether the handover was triggered when close to loosing coverage may also be used by the target base station to determine the hand over command. In this case the target base station only includes the minimum amount of information of the HO COMMAND 77.

Referring to FIG. 4, at step 79 the HO REQUEST ACKNOWLEDGE 79 is transmitted to the serving base station 71, followed by the handover command (HO COMMAND) 77. The handover command is subsequently sent from the serving base station 71 to the mobile terminal 74.

Figure 5:
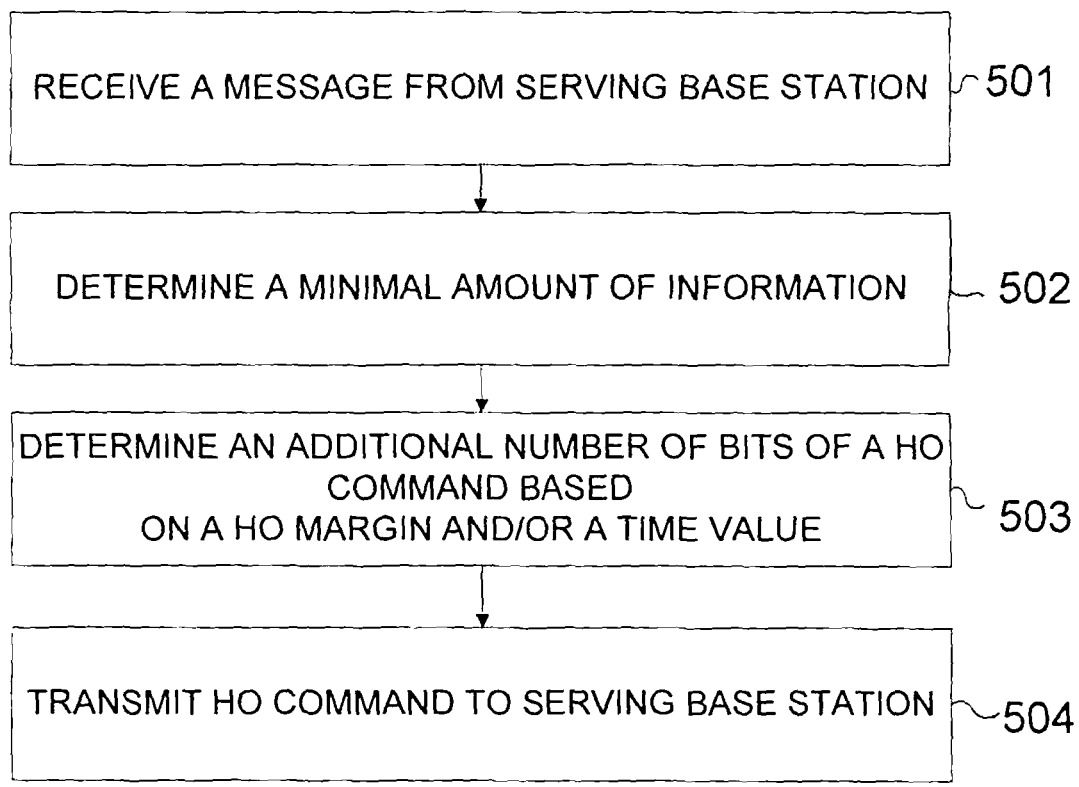
FIG. 5 illustrates a method according to exemplary embodiments of the present invention.

Referring to FIG. 5 there is illustrated a flowchart of a method describing the steps when the size of the handover command is adapted in the target base station, in accordance with previously described embodiments of the present invention. As shown in FIG. 5, the method comprise:
(501) receiving a message from the serving base station;
(502) determining a minimum amount of information;
(503) determining an additional number of bits of a HO command based on a handover margin and/or a time value (e.g. TTT or TTS);
(504) transmitting HO command to the serving base station.

As previously described, in case the target base station calculates the mean value and the variance of the signal strengths then an additional step of calculating the mean value and the variance is performed after step (501) but before step (502).

Figure 6:
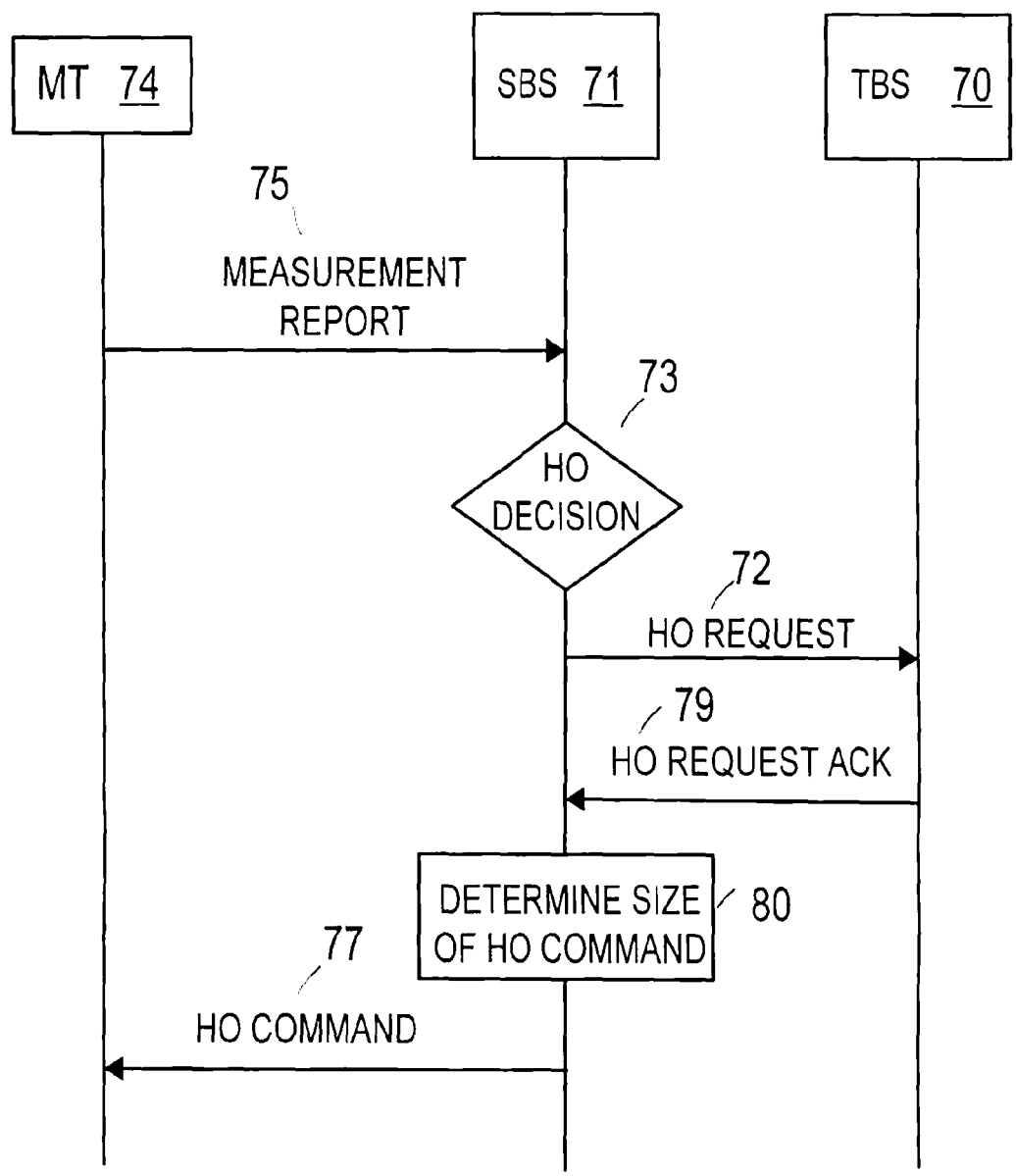
FIG. 6 illustrates a signaling diagram for a handover procedure according to exemplary embodiments of the present invention.

Turning now to FIG. 6, which shows a signaling diagram according to another exemplary embodiments of the present invention, where the size of a handover command (HO Command) 77 is adapted in a serving base station (SBS) 71.

As shown, after the HO DECISION 73 is taken by the SBS 71 the SBS transmits a HO REQUEST 72 to the TBS 70 as previously described. However as shown in FIG. 6, a HO REQUEST ACK 79 is received by SBS 71 prior to the SBS 71 determining in 80 a size of a HO COMMAND 77.

Similarly to previously described embodiments where the TBS 70 was responsible for determining the HO COMMAND size, a minimum amount of information of the HO COMMAND 77, necessary for the mobile terminal 74 to be able to communicate with the TBS 70 is here instead determined by the SBS 71. The minimum amount of information includes a temporary MAC ID for the mobile terminal 74. The minimum amount of information may further include the target cell ID and a carrier frequency. The minimum amount of information may also include an uplink and a downlink bandwidth. Also here, the uplink and downlink bandwidth of the target cell are only included in case these are different from the uplink and downlink bandwidth of the serving cell served by SBS 71. The minimum amount of information may also include a Random Access Channel (RACH) preamble to be used in the target cell. Also here, the preamble is only included in case of dedicated random access to the target cell served by the TBS.

In the step 80 the serving base station 71 also determines a number of bits required for the minimum amount of information.

According to an exemplary embodiment of the invention the SBS 71 further determines an additional number of bits for the HO COMMAND 77 using formula (1) previously described. Note that in this case HANDOVER MARGIN and the TTT and/or the TTS are already known to the SBS 71. Thus, according to formula (1), the size of the HO COMMAND 77 is inversely proportional to HANDOVER MARGIN and N*TTT. When N is larger than 1 then N*TTT=TTS as previously described.

According to another embodiment of the invention, the SBS 71 determines the additional number of bits for the HO COMMAND 77 using formula (2) previously described. In this exemplary embodiment the signal strength perceived by the mobile terminal (MT) 74, from the serving base station, is taken into account. The value of the signal strength is included in the measurement report 75 received from MT 74. The signal strength value may for instance be a Received Signal Received Power (RSRP) value.

According to yet another embodiment of the invention, the SBS 71 determines the additional number of bits for the HO COMMAND 77 using formula (4) previously described. In this exemplary embodiment the SBS 71 calculates a mean value and a variance of the signal strengths included in two or more received measurement reports 75 from the MT 74. The signal strength value may also in this case represent a Received Signal Received Power (RSRP) value, a Received Signal Strength Quality (RSRQ) value or a Received Signal Strength Indicator (RSSI) value.

The SBS 71 may further use information on its cell. Information on the cell may indicate that the cell is a is a macro, a micro, a pico or a femto cell. It should be noted that information on whether the handover was triggered when the MT 74 was close to loosing coverage may also be used by the SBS 71 to determine the HO COMMAND 77. In this case the SBS 71 only includes the minimum amount of information of the HO COMMAND 77. After the SBS 71 has determined the HO COMMAND 77 it transmits the command to MT 74.

Figure 7:
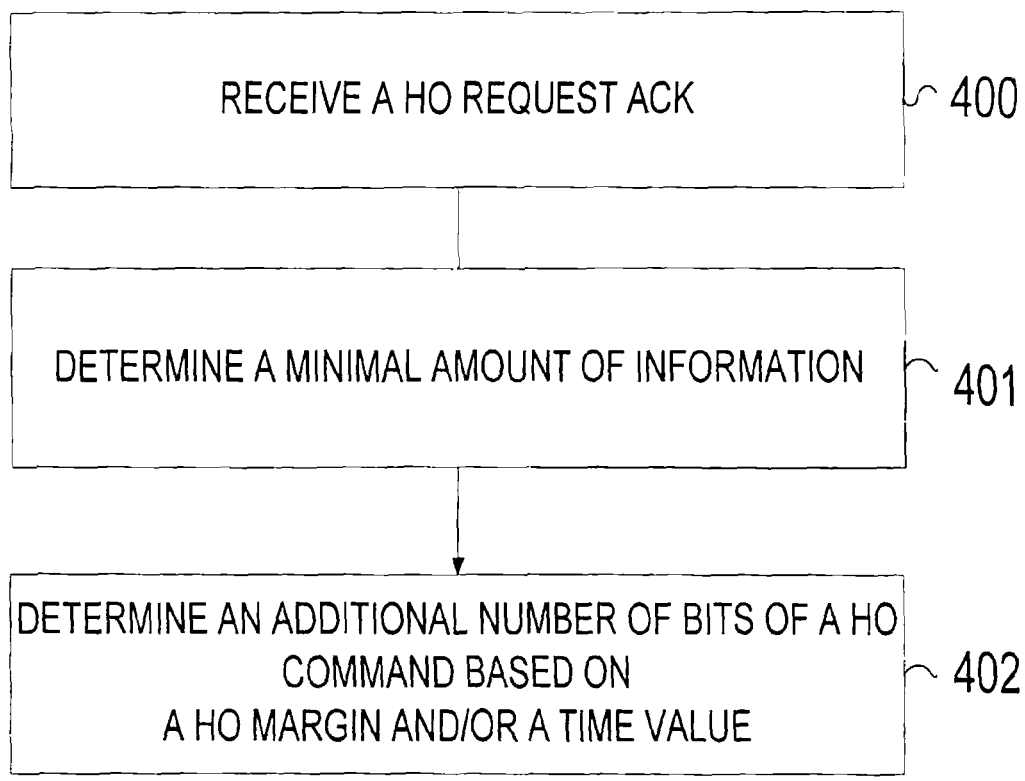
FIG. 7 illustrates a method according to other exemplary embodiments of the present invention.

Referring to FIG. 7 there is illustrated a flowchart of a method when the size of HO COMMAND is adapted in the SBS, in accordance with previously described embodiments of the present invention. As shown in FIG. 7, the steps of the method comprise:

(400) receiving a HO REQUEST ACK
(401) determining a minimum amount of information;
(402) determining an additional number of bits of a HO command based on a handover margin and/or a time value (e.g. TTT or TTS);

As previously described, in case the SBS calculates the mean value and the variance of the signal strengths included in two or more received measurement reports 75 from the MT 74, then an additional step of calculating the means value and the variance is performed after step (400) but prior to step (401).

Figure 8:
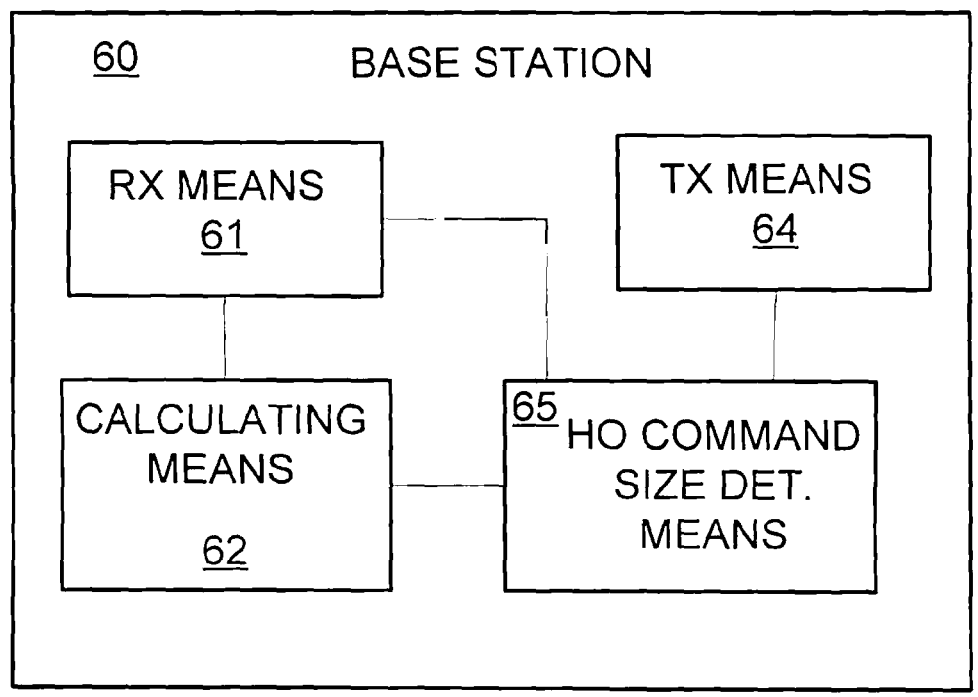
FIG. 8 illustrates a block diagram of a base station according to exemplary embodiments of the present invention.

Referring to FIG. 8, there is illustrated a block diagram of a base station 60 which can act as a serving base station and/or a target base station in accordance with previously described exemplary embodiments of the present invention. When acting as a target base station, base station 60 comprises receiving means (RX MEANS) 61 that is configured to receive a HO REQUEST from another base station, i.e. a serving base station. Base station 60 also comprises a HO COMMAND size determining means (DET. MEANS) 65 configured to both determine the size of the HO COMMAND, as previously described, and configured to determine the HO COMMAND. Base station 60 further comprises a transmitting means (TX MEANS) 64 configured, as previously described, to transmit the determined HO COMMAND to the other base station (i.e. the serving base station). TX MEANS 64 is also arranged to send the HO REQUEST ACK to the serving base station as previously described. As shown in FIG. 8, base station 60 further comprises CALCULATING MEANS 62 that is configured to calculate a mean value and a variance value of signal strengths received by the serving base station in the HO REQUEST or in the measurement reports included in the HO REQUEST. As previously stated, it is the mobile terminal that measures the signal strength(s) from its serving base station and reports them to its serving base station. It should be noted that the base station 60 may include other means not illustrated in FIG. 8.

As mentioned above, base station 60 can also act as a serving base station. In such case, the TX MEANS 64 is configured to transmit the HO REQUEST to another base station (i.e. a target base station) and the RX MEANS 61 is configured to receive a HO REQUEST ACK from the other base station (i.e. the target base station). Upon receiving the HO REQUEST ACK, base station 60 determines a size of a HO COMMAND as previously described in conjunction with FIG. 6. MEANS 65 is responsible in determining the size of the HO COMMAND. The TX MEANS 64 of the serving base station 60 is further configured to send the HO COMMAND to the mobile terminal. The RX MEANS 61 is, as previously described, also configured to receive measurement report(s) from the mobile terminal. Signal strength values included in these reports can be used by CALCULATING MEANS 62 to determine a means value and a variance value, as previously described.

Details concerning the determination of the size of HO COMMAND were previously described both in case the base station 60 is a target base station and in the case base station 60 is a serving base station. Therefore, such details are not repeated here.

It should be noted that base station 60 depicted in FIG. 8 may comprise other elements or means not illustrated. Furthermore, the different blocks of base station 60 are not necessarily separated but could be included in a single block.

While the present invention has been described with respect to particular embodiments (including certain device arrangements and certain orders of steps within various methods), those skilled in the art will recognize that the present invention is not limited to the specific embodiments described and illustrated herein. Therefore, it is to be understood that this disclosure is only illustrative. Accordingly, it is intended that the invention be limited only by the scope of the claims appended hereto.

Appendix

[1] 3GPP TS 25.331, V8.0.0, "3rd Generation Partnership Project; Technical Specification Group Radio Access Network; Overall Description; Stage 2, (Release 8), September 2007.

[2] 3GPP TS 36.300, V8.2.0, "3rd Generation Partnership Project; Technical Specification Group Radio Access Network; Evolved Universal Terrestrial Radio Access (E-UTRA) and Evolved Universal Terrestrial Radio Access (E-UTRA) Network (E-UTRAN); Overall Description; Stage 2, (Release 8), September 2007.

[3] 3GPP TS 36.331, V8.0.0, "3rd Generation Partnership Project; Technical Specification Group Radio Access Network; Evolved Universal Terrestrial Radio Access (E-UTRA); Radio Resource Control (RRC); Protocol Specification (Release 8), Dec. 2007.

The invention claimed is:

1. A method for a base station for determining a handover command, the method comprises the steps of:
   determining a minimum amount of information necessary for said handover command, said information comprises a temporary media access control identification, MAC ID, for a mobile terminal and a number of bits required for said information; and
   determining an additional number of bits for said handover command, as inversely proportional to a handover margin and/or a time value, said handover margin representing a difference in signal strength required to trigger said handover of said mobile terminal between said base station and another base station, and wherein said time value representing a time required to trigger a handover of said mobile terminal between said base station and said another base station, during which a difference between a signal strength measured by said mobile terminal on a signal from said base station and another signal strength measured by said mobile terminal on a signal from said another base station, is equal to or greater than said handover margin.

2. The method according to claim 1, wherein said time value is a multiple of another time value required to trigger a measurement report of said mobile terminal, during which said difference between said signal strength measured by said mobile terminal and the another signal strength measured by the mobile terminal, is equal to or greater than said handover margin.

3. The method according to claim 1, further comprising:
   receiving a message from said another base station, said message comprising said handover margin and said time value; and
   transmitting said handover command to said another base station after said step of determining said additional number of bits.

4. The method according to claim 3, wherein:
   said message further comprises said another signal strength, and
   the step of determining said additional number of bits further comprises increasing the additional number of bits of said handover command when said another signal strength is above a threshold value.

5. The method according to claim 3, wherein:
   said message further comprises a last measurement report received by said another base station from said mobile terminal, where said measurement report comprises said another signal strength measured by said mobile terminal, and
   the step of determining said additional number of bits further comprises increasing the additional number of bits of said handover command when said another signal strength is above a threshold value.

6. The method according to claim 3,
   wherein said message further comprises several measurement reports received by said another base station from said mobile terminal and where each of said measurement reports comprises said another signal strength measured by said mobile terminal,
   the method comprises the further step of calculating a mean value and a variance of said another signal strengths, and
   wherein the step of determining said additional number of bits further comprises increasing the additional number of bits of said handover command when said mean value is above a threshold value and decreasing the additional number of bits of said handover command when said variance is above another threshold value.

7. The method according to claim 3, wherein:
   said message further comprises information about a source cell type, and
   the step of determining said additional number of bits further comprises determining the additional number of bits of said handover command based on said source cell type.

8. The method according to claim 3, wherein:
   said message further comprises information whether said mobile terminal is close to losing coverage from said another base station, and
   the step of determining said additional number of bits further comprises only including said minimum amount of information of said handover command when said mobile terminal is close to losing coverage.

9. The method according to claim 1 wherein the step of determining said additional number of bits further comprises increasing the additional number of bits of said handover command based on said signal strength, in a last measurement report received by said mobile terminal when said signal strength is above a threshold value.

10. The method according to claim 1, wherein the method comprises the further step of:
    calculating a mean value and a variance of said signal strengths in several measurement reports received by said base station from said mobile terminal, and
    wherein the step of determining said additional number of bits further comprises increasing the additional number of bits of said handover command when said mean value is above a threshold value and decreasing said handover command when said variance is above another threshold value.

11. The method according to claim 1, wherein the step of determining said additional number of bits further comprises increasing the additional number of bits of said handover command when said signal strength is above a threshold value.

12. The method according to claim 9 wherein the step of determining said additional number of bits further comprises determining the additional number of bits of said handover command based on a source cell type.

13. A base station for use in a mobile telecommunication system, the base station comprising:

circuitry configured for determining a minimum amount of information necessary for a handover command, wherein:

said information comprises a temporary media access control identification, MAC ID, for a mobile terminal and a number of bits required for said information;

said circuitry configured for determining are further configured for determining an additional number of bits of said handover command as inversely proportional to a handover margin and a time value;

said handover margin representing a difference in signal strength required to trigger a handover of said mobile terminal between said base station and another base station; and said time value representing a time required to trigger a handover of said mobile terminal between said base station and said another base station, during which a difference between a signal strength measured by said mobile terminal on a signal from said base station and another signal strength measured by said mobile terminal on a signal from said another base station, is equal to or greater than said handover margin.

14. The base station according to claim 13, wherein said time value is a multiple of another time value required to trigger a measurement report of said mobile terminal, during which said difference between said signal strength measured by said mobile terminal and the another signal strength measured by the mobile terminal, is equal to or greater than said handover margin.

15. The base station according to claim 13, wherein said base station further comprises:

receiving circuitry configured for receiving a message from said another base station, said message comprising said handover margin and said time value; and transmitting circuitry configured for transmitting said handover command to said another base station.

16. The base station according to claim 15, wherein:
said message further comprises said another signal strength, and
said circuitry configured for determining said additional number of bits is further configured to increase the additional number of bits of said handover command when said another signal strength is above a threshold value.

17. The base station according to claim 16, wherein:
said message further comprises a measurement report received by said another base station from said mobile terminal,
said measurement report comprises said another signal strength, and
said circuitry configured for determining said additional number of bits is further configured to increase the additional number of bits of said handover command when said another signal strength is above a threshold value.

18. The base station according to claim 17, wherein:
said message further comprises several measurement reports received by said another base station from said mobile terminal and where each of said measurement reports comprises said another signal strength: and
said base station further comprises:
circuitry configured for calculating a mean value and a variance of said another signal strengths, and
wherein said circuitry configured for determining said additional number of bits is further configured to increase the additional number of bits of said handover command when said mean value is above a threshold value and to decrease the additional number of bits when said variance is above another threshold value.

19. The base station according to claim 15 wherein:
said message further comprises information about a source cell type, and
said circuitry configured for determining said additional number of bits is further configured to determine the additional number of bits of said handover command based on said source cell type.

20. The base station according to claim 15 wherein:
said message further comprises information whether said mobile terminal is close to losing coverage of said another base station, and
said circuitry configured for determining said additional number of bits is further configured to only include said minimum amount of information of said handover command, when said mobile terminal is close to losing coverage.

21. The base station according to claim 13, wherein the base station further comprises:
circuitry configured for calculating a mean value and a variance of said signal strengths in several measurement reports received by said base station from said mobile terminal, and
wherein the circuitry configured for determining said additional number of bits is further configured to increase the additional number of bits of said handover command when said mean value is above a threshold value and to decrease the additional number of bits when said variance is above another threshold value.

22. The base station according to claim 13, wherein said circuitry configured for determining said additional number of bits is further configured to increase the additional number of bits of said handover command when said signal strength is above a threshold value.

23. The base station according to claim 21 wherein said circuitry configured for determining said additional number of bits is further configured for determining the additional number of bits of said handover command based on a source cell type.

24. The base station according to claim 21 wherein said circuitry configured for determining said additional number of bits is further configured to decrease the additional number of bits of said handover command when said mobile terminal is close to losing coverage.

* * * * *